United States Patent
Kakinuma et al.

(10) Patent No.: US 10,809,872 B2
(45) Date of Patent: Oct. 20, 2020

(54) DISPLAY CONTROL DEVICE

(71) Applicant: TOYOTA JIDOSHA KABUSHIKI KAISHA, Toyota-shi, Aichi-ken (JP)

(72) Inventors: Shoji Kakinuma, Okazaki (JP); Hirotake Sano, Nagakute (JP); Tatsuya Tanizawa, Nisshin (JP); Akihiro Ueda, Nisshin (JP); Koshi Ito, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 22 days.

(21) Appl. No.: 16/032,714

(22) Filed: Jul. 11, 2018

(65) Prior Publication Data
US 2019/0107934 A1   Apr. 11, 2019

(30) Foreign Application Priority Data

Oct. 11, 2017   (JP) .................. 2017-197455

(51) Int. Cl.
| | |
|---|---|
| *G06F 3/0482* | (2013.01) |
| *G06F 3/0488* | (2013.01) |
| *G06F 3/0481* | (2013.01) |
| *B60K 37/00* | (2006.01) |

(Continued)

(52) U.S. Cl.
CPC .......... *G06F 3/04812* (2013.01); *B60K 35/00* (2013.01); *B60K 37/00* (2013.01); *B60K 37/06* (2013.01); *G06F 3/0482* (2013.01); *G06F 3/0488* (2013.01); *G06F 3/04817* (2013.01); *B60K 2370/11* (2019.05); *B60K 2370/113* (2019.05); *B60K 2370/115* (2019.05); *B60K 2370/117* (2019.05); *B60K 2370/119* (2019.05); *B60K 2370/1434* (2019.05); *B60K 2370/152* (2019.05); *B60K 2370/52* (2019.05)

(58) Field of Classification Search
None
See application file for complete search history.

(56) References Cited

U.S. PATENT DOCUMENTS

| | | | | |
|---|---|---|---|---|
| 5,798,752 A | * | 8/1998 | Buxton | G06F 3/038 345/157 |
| 6,157,367 A | * | 12/2000 | Van Der Haar | G06F 3/04812 715/856 |

(Continued)

FOREIGN PATENT DOCUMENTS

JP   2010287007 A   12/2010

*Primary Examiner* — Yongjia Pan
(74) *Attorney, Agent, or Firm* — Hunton Andrews Kurth LLP

(57) ABSTRACT

A display control device includes a receiving portion configured to receive operation information input to a touch input portion, the touch input portion being located away from a display portion; and a processing portion configured to control display on the display portion in accordance with the operation information that is received by the receiving portion. The processing portion is configured to cause the display portion to display an image in which a cursor is disposed inside a plurality of icons that are circumferentially disposed, and the processing portion is configured to move the cursor to an icon among the plurality of icons, the icon being located in a direction of a slide operation received by the receiving portion.

6 Claims, 4 Drawing Sheets

(51) Int. Cl.
*B60K 37/06* (2006.01)
*B60K 35/00* (2006.01)

(56) References Cited

U.S. PATENT DOCUMENTS

| | | | | |
|---|---|---|---|---|
| 7,096,431 | B2* | 8/2006 | Tambata | G01C 21/3664 |
| | | | | 701/1 |
| 7,509,592 | B1* | 3/2009 | Martinez | G06F 3/04812 |
| | | | | 715/862 |
| 7,693,631 | B2* | 4/2010 | Yukawa | G06F 3/0482 |
| | | | | 345/156 |
| 8,549,432 | B2* | 10/2013 | Warner | G06F 3/0482 |
| | | | | 715/834 |
| 8,601,389 | B2* | 12/2013 | Schulz | G06F 3/0482 |
| | | | | 345/156 |
| 9,507,512 | B1* | 11/2016 | Turner | G06F 3/0488 |
| 9,555,707 | B2* | 1/2017 | Nakagawa | B60H 1/00985 |
| 10,019,133 | B1* | 7/2018 | McNeill | G06F 3/0486 |
| 2003/0197740 | A1* | 10/2003 | Reponen | G06F 3/0482 |
| | | | | 715/810 |
| 2007/0271528 | A1* | 11/2007 | Park | H04M 1/72544 |
| | | | | 715/810 |
| 2008/0015841 | A1* | 1/2008 | Longe | G06F 3/0236 |
| | | | | 704/1 |
| 2008/0222569 | A1* | 9/2008 | Champion | G06F 3/0482 |
| | | | | 715/834 |
| 2009/0327955 | A1* | 12/2009 | Mouilleseaux | G06F 3/04812 |
| | | | | 715/810 |
| 2010/0073329 | A1* | 3/2010 | Raman | G06F 3/04883 |
| | | | | 345/177 |
| 2012/0036476 | A1* | 2/2012 | Oh | G06F 3/0481 |
| | | | | 715/811 |
| 2013/0132904 | A1* | 5/2013 | Primiani | G06F 3/048 |
| | | | | 715/834 |
| 2014/0096052 | A1* | 4/2014 | Aoshima | G06F 3/0486 |
| | | | | 715/769 |
| 2014/0111430 | A1* | 4/2014 | Shima | G06F 3/014 |
| | | | | 345/157 |
| 2015/0046876 | A1* | 2/2015 | Goldenberg | G06F 3/0482 |
| | | | | 715/834 |
| 2015/0089407 | A1* | 3/2015 | Suzuki | G06F 3/0482 |
| | | | | 715/763 |
| 2015/0169505 | A1* | 6/2015 | Kim | G06F 3/0484 |
| | | | | 715/269 |
| 2015/0199020 | A1* | 7/2015 | Hatada | G06F 3/04812 |
| | | | | 345/158 |
| 2017/0031581 | A1* | 2/2017 | Chilmulwar | G06F 3/04847 |

\* cited by examiner

DISPLAY CONTROL DEVICE

INCORPORATION BY REFERENCE

The disclosure of Japanese Patent Application No. 2017-197455 filed on Oct. 11, 2017 including the specification, drawings and abstract is incorporated herein by reference in its entirety.

BACKGROUND

1. Technical Field

The disclosure relates to a display control device that controls image display on a display portion on the basis of operation information input to a touch input portion.

2. Description of Related Art

A mobile terminal device used to input information that corresponds to the display on a display portion such as a television is disclosed in Japanese Patent Application Publication No. 2010-287007 (JP 2010-287007 A). In this mobile terminal device, a plurality of keys are set by radially segmenting a surface that detects touch input.

SUMMARY

In the case where the display portion and the mobile terminal device are located away from each other, and the plurality of keys are set on the touch input surface, a user looks at a position of the key to touch the key. Thus, the user's line of sight moves between the touch input surface and the display portion, and it is troublesome to move the line of sight.

The disclosure provides a technique of disposing a cursor and an icon displayed on a display portion, the technique facilitating touch input for moving the cursor to the icon.

An aspect of the disclosure relates to a display control device including a receiving portion configured to receive operation information input to a touch input portion, the touch input portion being located away from a display portion; and a processing portion configured to control display on the display portion in accordance with the operation information that is received by the receiving portion. The processing portion is configured to cause the display portion to display an image in which a cursor is disposed inside a plurality of icons that are circumferentially disposed, and the processing portion is configured to move the cursor to an icon among the plurality of icons, the icon being located in a direction of a slide operation received by the receiving portion.

According to the above-described aspect, the plurality of icons are circumferentially disposed, and an initial position of the cursor is set inside the plurality of icons. Thus, when any of the plurality of icons is selected, the cursor can be easily moved to any of the plurality of icons by the slide operation in one direction.

The processing portion may be configured to move the cursor from the icon that the cursor overlaps to an adjacent icon in a case where the receiving portion receives the slide operation in a direction tangential to a circle formed by the plurality of icons in a state where the cursor overlaps the icon. Thus, the user can easily move the cursor from the icon to the adjacent icon.

The processing portion may be configured to move the cursor to an area inside the plurality of icons in a case where the receiving portion receives the slide operation toward a center of a circle formed by the plurality of icons in a state where the cursor overlaps the icon. Thus, the user can easily move the cursor to a central position.

The above aspect of the disclosure can provide a technique of disposing the cursor and the icons displayed on the display portion, the technique facilitating touch input for moving the cursor to the icon.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
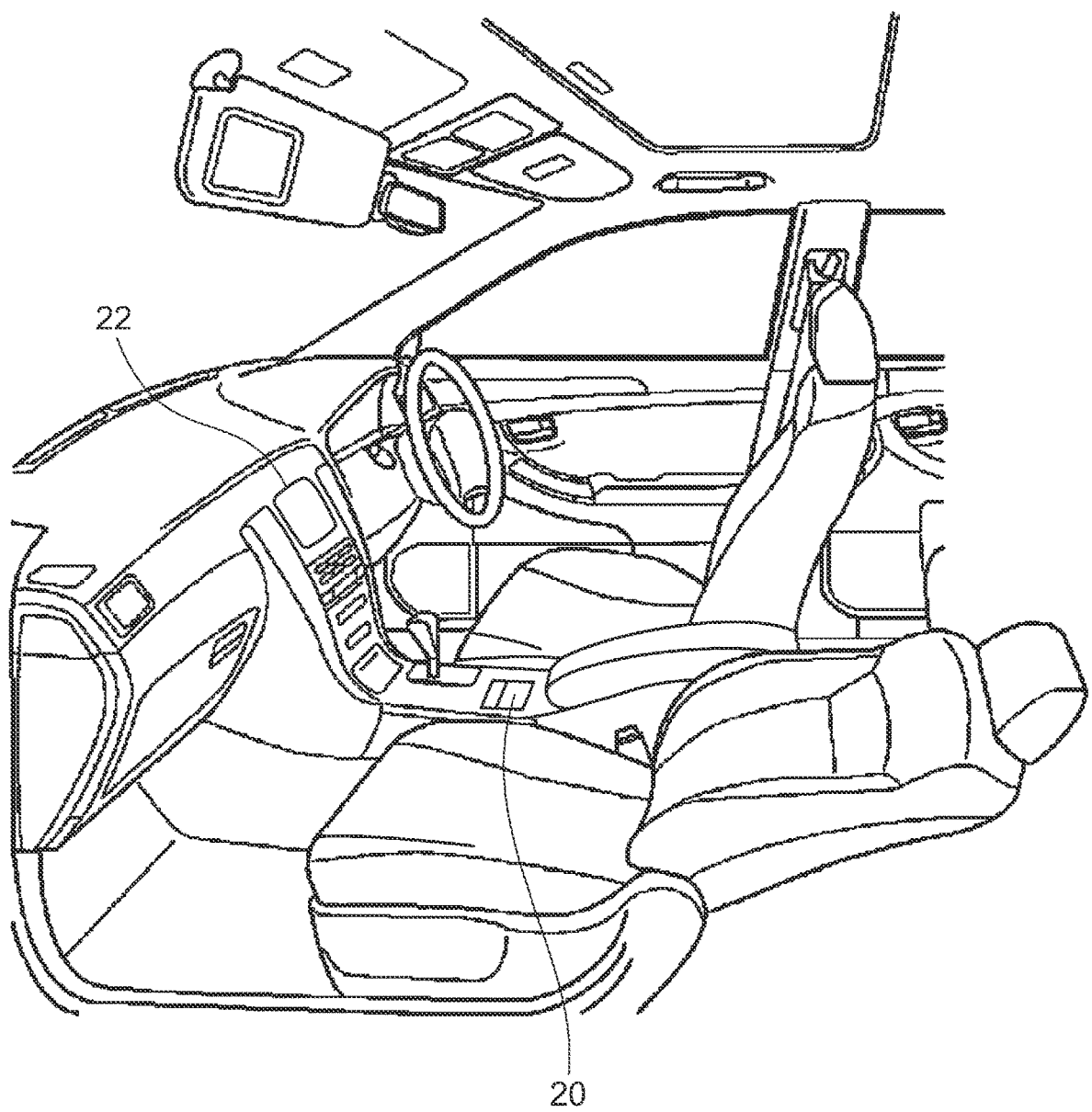
FIG. 1 is a view illustrating a touch input portion and a display portion provided in a vehicle.

FIG. 1 is a view illustrating a touch input portion 20 and a display portion 22 that are provided in a vehicle. The touch input portion 20 is provided in a center console between a driver's seat and a passenger's seat. The touch input portion 20 is an input device of a touch-screen type (i.e., a touchpad input device) to which a user's touch operation is input. The touch input portion 20 outputs an input signal caused by the touch operation to a display control device (not shown). Then, when the display control device performs control, an image is displayed on the display portion 22.

The display portion 22 is provided in a dashboard that is located away from the touch input portion 20, and displays the image. The display portion 22 and the touch input portion 20 are disposed at different height positions from each other. On a vehicle front side, the display portion 22 is provided at the higher position than the touch input portion 20. The user places his/her wrist on the center console, looks at the display portion 22, but does not look at the touch input portion 20 to input the touch operation, such as a slide operation or a tapping operation, to the touch input portion 20, and thereby selects an in-vehicle function. Note that the touch input portion 20 may be provided with mechanical switches such as a menu button to call a menu image and a back button to return to a previous image.

Figure 2:
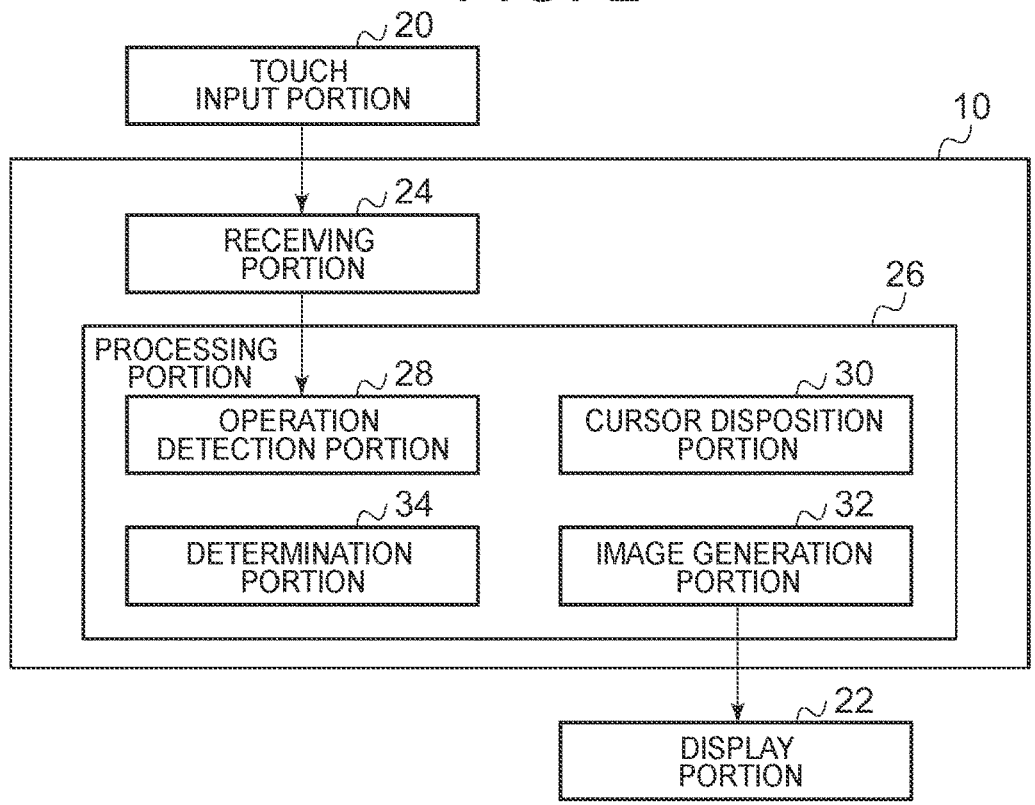
FIG. 2 is a diagram illustrating a functional configuration of a display control device.

FIG. 2 is a diagram illustrating a functional configuration of a display control device 10. In FIG. 2, elements illustrated as functional blocks that execute various types of processing can each be constructed of a circuit block, memory, or another large-scale integrated circuit (LSI) in terms of hardware and are each implemented by a program loaded onto the memory or the like in terms of software. Accordingly, a person skilled in the art can understand that these functional blocks can be implemented by any of various configurations that include hardware only, software only, or a combination of hardware and software, and thus the functional configuration is not limited to any of the various configurations.

The display control device 10 includes a receiving portion 24 and a processing portion 26. The receiving portion 24 receives operation information input to the touch input portion 20. The processing portion 26 controls the display on the display portion 22 in accordance with the operation information received by the receiving portion 24. The operation information that is output from the touch input portion 20 includes coordinate information indicating an input position of the touch operation and input information of the mechanical switch. The input position in the touch input portion 20 is converted to the coordinate information in which a vehicle front-rear direction corresponds to an up-down direction and a vehicle width direction corresponds to a right-left direction with a starting point of the input (an input starting point) being a zero point, for example.

The processing portion 26 includes an operation detection portion 28, a cursor disposition portion 30, an image generation portion 32, and a determination portion 34. The operation detection portion 28 determines a kind of the operation from a locus between the starting point of the input and an end point of the input indicated by the operation information. In the case of the slide operation, the operation detection portion 28 detects a slide direction and a slide distance. The kinds of the operation include the slide operation, the tapping operation, a pinch operation, a long-pressing operation, and the like, for example.

The cursor disposition portion 30 determines (decides) disposition of a cursor that is displayed on the display portion 22 on the basis of the input to the touch input portion 20. That is, the cursor disposition portion 30 determines (decides) positional coordinates of the cursor on the display portion 22 on the basis of the detection result obtained by the operation detection portion 28. The cursor disposition portion 30 disposes (places) the cursor such that the cursor is moved on a screen of the display portion 22 in accordance with the slide operation on the touch input portion 20. The cursor disposition portion 30 may convert a slide operation amount on the touch input portion 20 to a movement amount of the cursor on the display portion 22 at a specified aspect ratio. The specified aspect ratio for the conversion may be set on the basis of a size ratio between the touch input portion 20 and the display portion 22.

The determination portion 34 determines (decides) that a function of an icon has been selected on the basis of the input to the touch input portion 20, that is, on the basis of the detection result obtained by the operation detection portion 28. For example, in the case where the tapping operation is performed in a state where the cursor overlaps the icon, the determination portion 34 determines (decides) execution of the in-vehicle function set for the icon, and the image generation portion 32 generates an image of the determined in-vehicle function.

The image generation portion 32 generates an image displayed on the display portion 22 in accordance with the input to the touch input portion 20, that is, on the basis of the detection result obtained by the operation detection portion 28, the result of disposition performed by the cursor disposition portion 30, and the result of determination performed by the determination portion 34. From the memory, which is not shown, the image generation portion 32 retrieves the menu image that includes a plurality of icons indicating the in-vehicle functions or an image indicating that the in-vehicle function is currently executed. Then, the image generation portion 32 adds the cursor to the retrieved image (i.e., the image generation portion 32 superimposes the cursor on the retrieved image) so as to generate the image. The icons indicating the in-vehicle functions are displayed as images that correspond to the in-vehicle functions such as navigation, a telephone, a music player, a radio, and room temperature setting.

For example, in the case where the menu button is pressed, the image generation portion 32 causes the display portion 22 to display the menu image. In the menu image, the cursor is disposed (radially) inside the plurality of icons that are circumferentially disposed (i.e., the plurality of icons disposed in a circumferential direction). Then, when the slide operation is performed on the touch input portion 20 in a state where the menu image is displayed, the image generation portion 32 moves the cursor to the icon that is located in a direction of the slide operation on the touch input portion 20, and causes the display portion 22 to display the cursor such that the cursor overlaps the icon (i.e., the cursor is superimposed on the icon). By circumferentially disposing the plurality of icons and setting an initial position of the cursor at a center of the icons, moving distances of the cursor to the icons can be made uniform, and the user can move the cursor to the desired icon by slide input in one direction. Note that the menu image is the display used to select the in-vehicle function. The disclosure is not limited to a configuration in which the menu image is displayed when the menu button is pressed, and the menu image may be displayed at startup or by the long-pressing operation on the touch input portion 20.

In the case where the receiving portion 24 receives the slide operation in a direction tangential to a circle formed by the plurality of icons (i.e., the tangential direction to the circle) in the state where the cursor overlaps the icon in the menu image, the image generation portion 32 causes the display portion 22 to display the cursor such that the cursor is moved from the icon that the cursor overlaps to the adjacent icon. In this way, the user can easily move the cursor from the icon to the adjacent icon, and the movement of the cursor beyond the adjacent icon can be prevented.

In the case where the receiving portion 24 receives the slide operation toward a center of the circle that is formed by the plurality of icons in the state where the cursor overlaps the icon, the image generation portion 32 causes the display portion 22 to display the cursor such that the cursor is moved to an area inside the plurality of icons. Thus, the user can easily move the cursor to the initial position.

Figure 3:
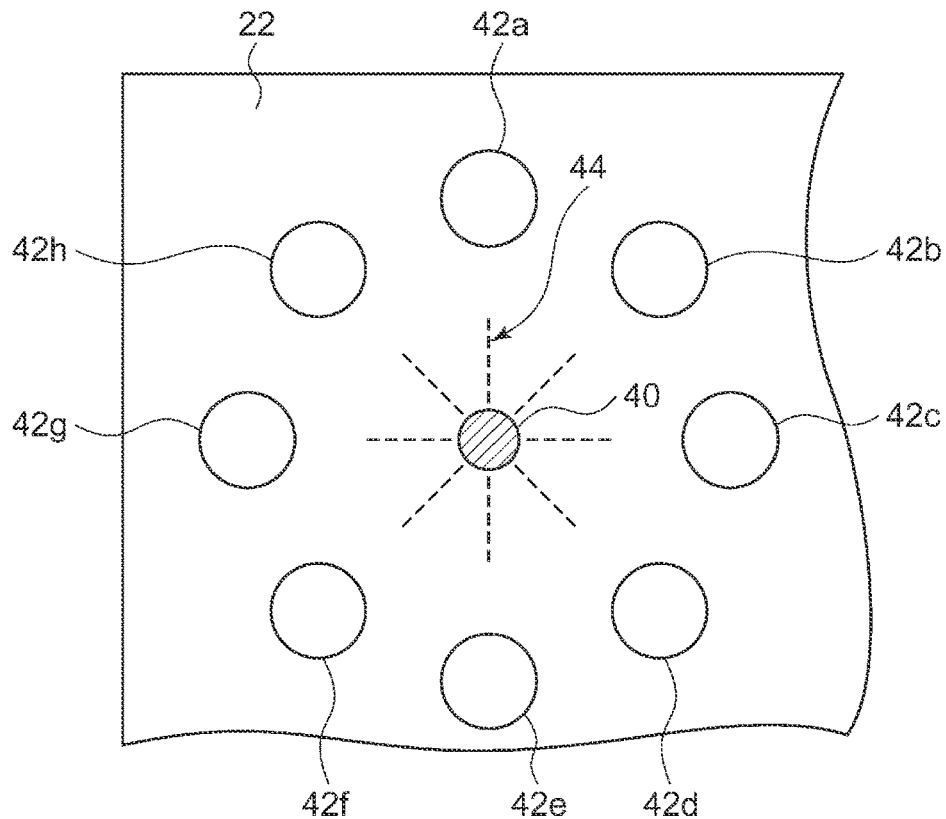
FIG. 3 is a view of the display portion that displays a menu image in an initial state.

FIG. 3 shows the display portion 22 that displays the menu image in an initial state. In the initial state of the menu image, a first icon 42a, a second icon 42b, a third icon 42c, a fourth icon 42d, a fifth icon 42e, a sixth icon 42f, a seventh icon 42g, and an eighth icon 42h (when these are not distinguished from each other, they will be simply referred to as "icons 42") are circumferentially disposed, and a cursor 40 is disposed at a center (radially) inside the icons 42. The initial state of the menu image may be displayed, for example, when the menu button is pressed, and/or when the display portion 22 and the display control device 10 are activated. Since the cursor 40 is disposed in the above-described manner, when the user performs the slide operation in any direction on the touch input portion 20, the cursor 40 is moved to one of the plurality of icons 42.

First guidelines 44 are radially displayed around the cursor 40. Each of the first guidelines 44 extends from the cursor 40 at a central position to the corresponding icon 42 and guides the user in a direction to the corresponding icon 42. That is, the image generation portion 32 causes the display portion 22 to display the first guidelines 44. The cursor 40 is displayed with lower or higher brightness than that of a background image of the menu image.

Figure 4A:
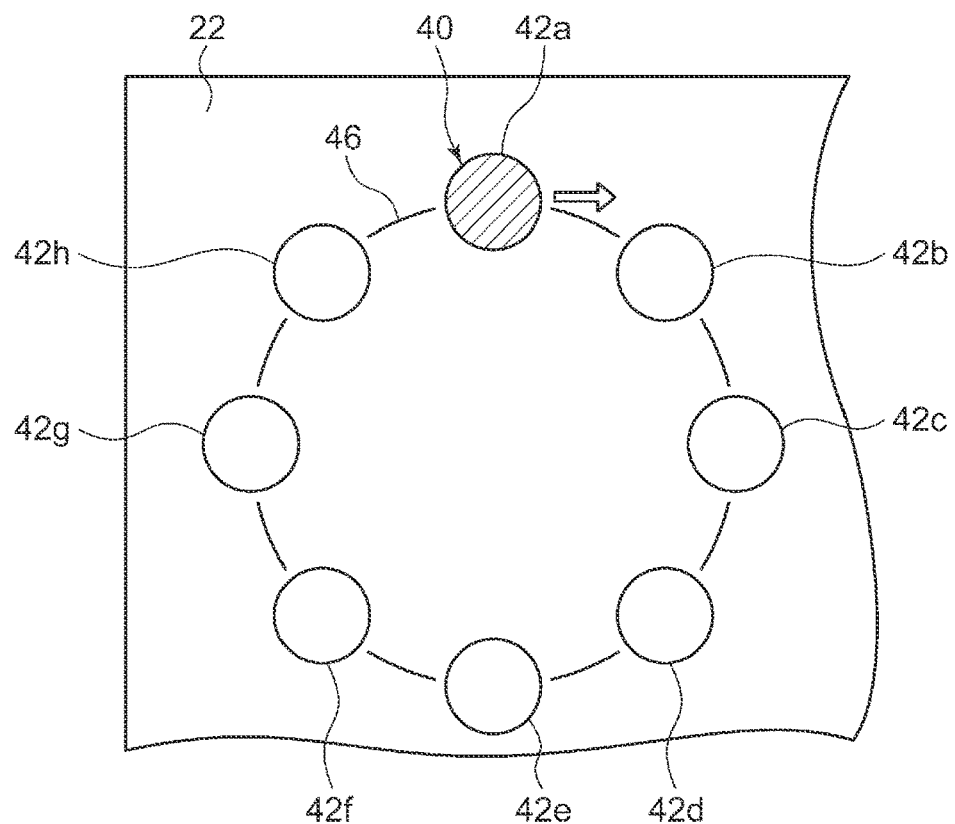
FIGS. 4A, 4B are views illustrating the menu image displayed when a user performs operations.
Figure 4B:
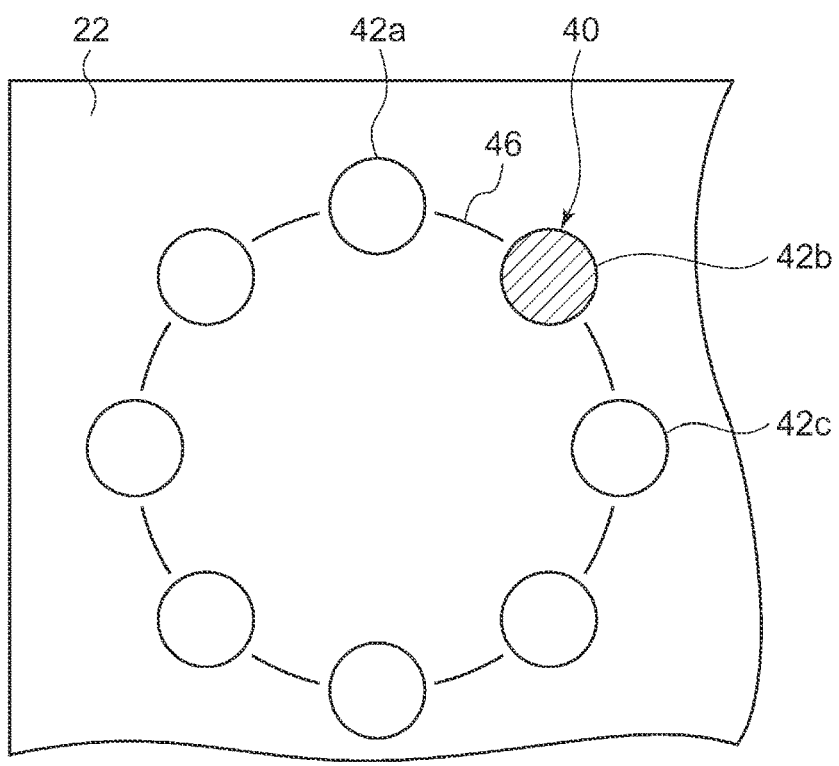

FIGS. 4A, 4B are views illustrating the menu image displayed when the user performs operations. When the user performs the slide operation toward a vehicle front side on the touch input portion 20 in the state where the menu image shown in FIG. 3 is displayed, the cursor 40 is moved to the first icon 42a located at an upper position in FIG. 4A and is displayed such that the cursor 40 overlaps the first icon 42a. When the slide operation is performed on the touch input portion 20 in the state where the menu image in the initial state is displayed, the image generation portion 32 moves the cursor 40 to the icon that is located in the direction of the slide operation on the touch input portion 20, and causes the display portion 22 to display the cursor 40 such that the cursor 40 overlaps the icon. In this way, when the operation detection portion 28 detects the slide operation performed by the user, the image generation portion 32 moves the cursor 40 to one of the icons 42. Thus, the user's operation for moving the cursor 40 to the icon can be facilitated.

The image generation portion 32 changes a pixel value of at least a part of the icon so as to indicate that the cursor overlaps the icon. Brightness of the first icon 42a that is shown in FIG. 4A and that the cursor 40 overlaps is changed to be lower or higher than brightness of the first icon 42a in a normal state shown in FIG. 3. In this way, the first icon 42a indicates that the cursor 40 overlaps the first icon 42a.

When the user performs the tapping operation on the touch input portion 20 in the state where the cursor 40 overlaps the first icon 42a, the determination portion 34 determines (decides) selection of the function that corresponds to the first icon 42a, and the image generation portion 32 generates the image of the function corresponding to the first icon 42a and causes the display portion 22 to display the image.

In the case where the cursor 40 overlaps the icon 42, the image generation portion 32 causes the display portion 22 to display arc-shaped second guidelines 46 that connect the plurality of icons 42 that are circumferentially disposed. Each of the second guidelines 46 is displayed so as to connect the adjacent icons 42 and thus can show the tangential direction toward the adjacent icon 42, to the user.

In the state where the cursor 40 overlaps the first icon 42a shown in FIG. 4A, in the case where the user performs the slide operation in a rightward direction on the touch input portion 20, that is, in the case where the receiving portion 24 receives the slide operation in the direction tangential to the circle formed by the plurality of icons 42, the image generation portion 32 moves the cursor 40 from the first icon 42a, which the cursor 40 overlaps, to the adjacent second icon 42b as shown in FIG. 4B. In this way, the user can easily move the cursor 40 to the adjacent icon 42 by performing the slide operation in the tangential direction.

Figure 5A:
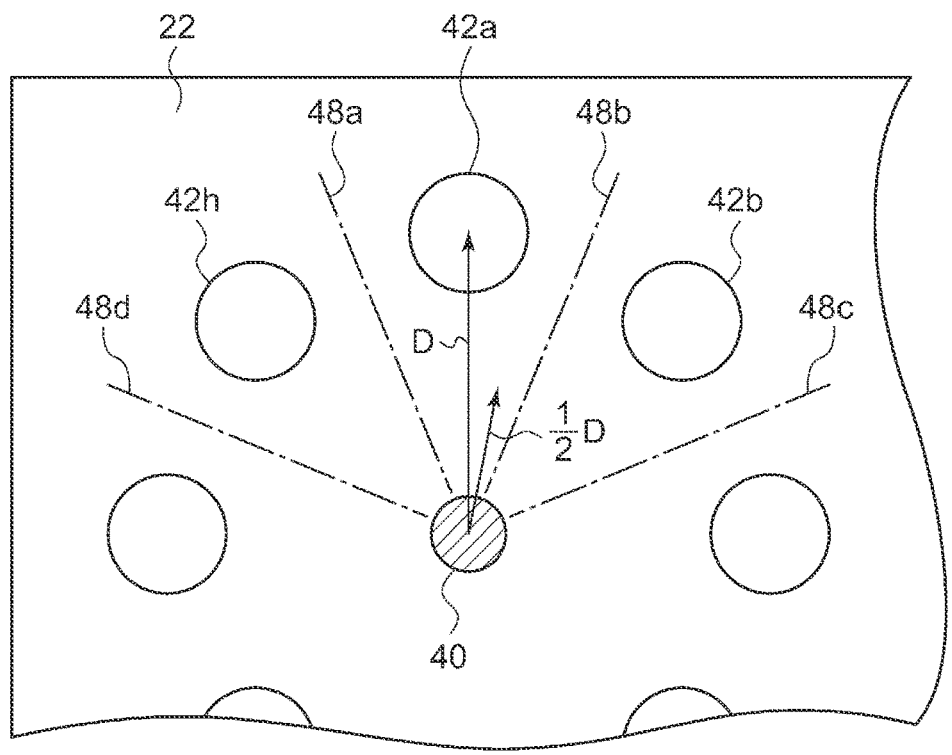
FIGS. 5A, 5B are views illustrating processing of disposing a cursor executed by a cursor disposition portion.
Figure 5B:
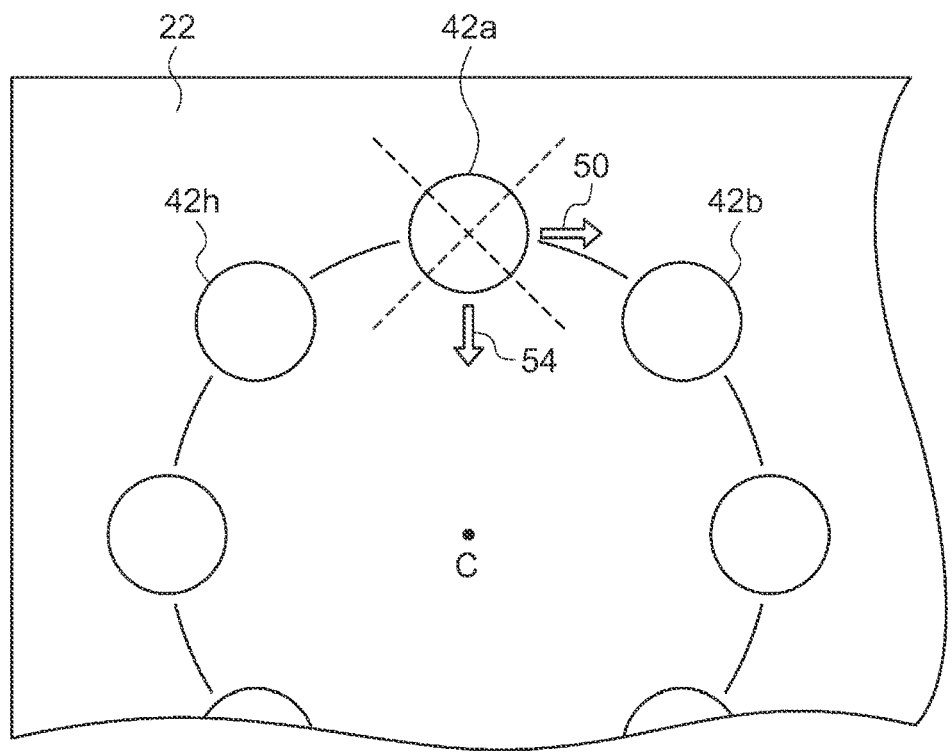

FIGS. 5A, 5B are views illustrating processing of disposing the cursor 40 executed by the cursor disposition portion 30. In the case where the slide operation in a direction within an angle range of 45 degrees between a first chain line 48a and a second chain line 48b as shown in FIG. 5A is detected on the touch input portion 20 in a state where the cursor 40 is located at the central position, the image generation portion 32 moves the cursor 40 to the first icon 42a. The first chain line 48a and the second chain line 48b extend radially from the central position at which the cursor 40 is located. The first chain line 48a extends in an intermediate position between the first icon 42a and the eighth icon 42h, and the second chain line 48b extends in an intermediate position between the first icon 42a and the second icon 42b.

In the case where the slide operation on the touch input portion 20 in a direction between the second chain line 48b and a third chain line 48c is detected in the state where the cursor 40 is located at the central position, the image generation portion 32 moves the cursor 40 to the second icon 42b. In the case where the slide operation on the touch input portion 20 in a direction between the first chain line 48a and a fourth chain line 48d is detected in the state where the cursor 40 is located at the central position, the image generation portion 32 moves the cursor 40 to the eighth icon 42h.

In the case where the slide operation is performed on the touch input portion 20 such that the cursor 40 moves over a distance that is equal to or longer than a half of a distance D between the cursor 40 at the central position and the first icon 42a, the image generation portion 32 causes the display portion 22 to display the cursor 40 such that the cursor 40 overlaps the first icon 42a. That is, in the case where the slide operation toward the icon 42 is detected even when the distance over which the cursor 40 is normally moved by the slide operation is shorter than the distance D, the cursor 40 is moved to the icon 42. In this way, the user can move the cursor 40 to the icon 42 with the small operation amount.

Note that, in the case where the slide operation is performed on the touch input portion 20 such that the cursor 40 is moved over a distance that is equal to or longer than one-third of the distance D between the cursor 40 at the central position and the icon 42, the image generation portion 32 may display the cursor 40 such that the cursor 40 overlaps the icon 42. In addition, even when the user performs the slide operation such that the cursor 40 moves over the distance D or longer, the cursor 40 may be maintained in a state where the cursor 40 overlaps the icon 42, without passing the icon 42 and without moving to an area outside the plurality of icons 42.

As shown in FIG. 5B, in the case where the receiving portion 24 receives the slide operation in a tangential direction 50 to the circle in the state where the cursor 40 overlaps the icon 42, the cursor 40 is moved to the second icon 42b. This tangential direction 50 toward the second icon 42b has an angle range of 90 degrees in a rightward direction of the touch input portion 20. Thus, even in the case where the slide direction deviates from the tangential direction 50, when the slide direction is within the set angle range, the user can move the cursor 40 to the adjacent icon 42.

In the case where the receiving portion 24 receives the slide operation toward a center C of the circle formed by the plurality of icons 42 in the state where the cursor 40 overlaps the first icon 42a, the cursor 40 is moved to the center C inside the plurality of icons 42. The slide operation toward the center C of the circle has an angle range of 90 degrees in a downward direction of the touch input portion 20. Thus, even in the case where the slide direction deviates from a direction toward the center of the circle, when the slide direction is within the set angle range, the user can move the cursor 40 to the center C of the circle, that is, the initial position of the cursor 40. From the initial position of the cursor 40, the cursor 40 is moved to any of the icons 42 by the slide operation in one direction.

The embodiment is merely illustrative, and a person skilled in the art will understand that various modifications can be made to a combination of the components and that such modifications fall within the scope of the disclosure.

For example, in the case where a driver places his/her wrist on the center console to perform the slide operation on the touch input portion 20, the user has difficulty in inputting an operation in the vehicle width direction that requires movement of the wrist, and finds it easy to input an operation in the vehicle front-rear direction that does not require the movement of the wrist and requires only movement of a finger. In view of the above, with regard to the disposition of the icons 42, the icons 42 with the frequently used functions may be disposed in the up-down direction in which it is easy to perform the input operation while the icons 42 with the less frequently used functions may be disposed in the right-left direction in which it is difficult to perform the input operation. In addition, when the slide operation amount on the touch input portion 20 is converted to the movement amount of the cursor 40 on the display portion 22, a conversion rate may differ between the up-down direction and the right-left direction. The movement amount of the cursor 40 on the display portion 22 may be set based on the slide operation amount on the touch input portion 20 such that the cursor 40 moves to a larger extent in the right-left direction than in the up-down direction.

What is claimed is:

1. A display control device comprising:
    a receiving portion configured to receive operation information input to a touch input portion, the touch input portion being located away from a display portion; and
    a processing portion configured to control a display on the display portion in accordance with the operation information that is received by the receiving portion, wherein
    the processing portion is configured to cause the display portion to display an image in which a cursor is disposed inside a plurality of icons that are circumferentially disposed, and the processing portion is configured to move the cursor to an icon among the plurality of icons, the icon being located in a direction of a slide operation received by the receiving portion,
    wherein, when the display portion is activated, the cursor is disposed at an initial position that is at a center of the circumferentially disposed plurality of icons,
    wherein, when the slide operation is performed in a manner such that the cursor moves over a first distance or longer, the cursor does not move to an area outside the plurality of icons, and
    wherein, the first distance is a distance between the cursor at the initial position and each of the plurality of icons.

2. The display control device according to claim 1, wherein the processing portion is configured to move the cursor from the icon that the cursor overlaps to an adjacent icon in a case where the receiving portion receives the slide operation in a direction tangential to a circle formed by the plurality of icons in a state where the cursor overlaps the icon.

3. The display control device according to claim 1, wherein the processing portion is configured to move the cursor to an area inside the plurality of icons in a case where the receiving portion receives the slide operation toward a center of a circle formed by the plurality of icons in a state where the cursor overlaps the icon.

4. The display control device according to claim 1, wherein:
    the processing portion is configured to cause the display portion to display first guidelines when the display portion is activated; and
    each of the first guidelines extends from the cursor located at a central position to a corresponding one of the plurality of icons.

5. The display control device according to claim 1, wherein the processing portion is configured to cause the cursor to overlap the icon after moving the cursor to the icon that is located in the direction of the slide operation received by the receiving portion.

6. The display control device according to claim 5, wherein the processing portion is configured to cause the display portion to display arc-shaped second guidelines that connect the plurality of icons that are circumferentially disposed in a case where the cursor overlaps the icon.

* * * * *